United States Patent [19]

Young

[11] 4,264,128

[45] Apr. 28, 1981

[54] MOLDED OPTICAL FIBER CONNECTORS

[75] Inventor: William C. Young, Middletown, N.J.

[73] Assignee: Bell Telephone Laboratories, Incorporated, Murray Hill, N.J.

[21] Appl. No.: 96,519

[22] Filed: Nov. 21, 1979

[51] Int. Cl.³ .................................................. G02B 5/14
[52] U.S. Cl. .................................. 350/96.20; 264/105
[58] Field of Search ................... 264/1, 250, 254, 275; 350/96.20, 96.21, 320

[56] References Cited

U.S. PATENT DOCUMENTS

| | | | |
|---|---|---|---|
| 4,107,242 | 8/1978 | Runge | 264/1 |
| 4,173,389 | 11/1979 | Curtis | 350/96.20 |
| 4,186,999 | 2/1980 | Harwood et al. | 350/96.21 |

FOREIGN PATENT DOCUMENTS 2753298  5/1979  Fed. Rep. of Germany ........ 350/96.20

Primary Examiner—John K. Corbin
Assistant Examiner—John D. Lee
Attorney, Agent, or Firm—David R. Padnes

[57] ABSTRACT

An insert (21) is molded within an optical fiber connector (2,3) to provide more precisely defined and symmetric alignment surfaces (5,6). The insert may be used for connectors directly molded about an optical fiber or for field mountable connectors subsequently affixed thereto. During molding, the insert partitions the mold cavity into two portions. The first portion (53) defines the alignment surfaces and the second defines the balance of the connector. Filler material (55) fills the second portion first and then is conducted through the insert to symmetrically fill the first portion. This directed flow control also precludes bending of the optical fiber (32) during direct molding of a connector about the fiber.

14 Claims, 8 Drawing Figures

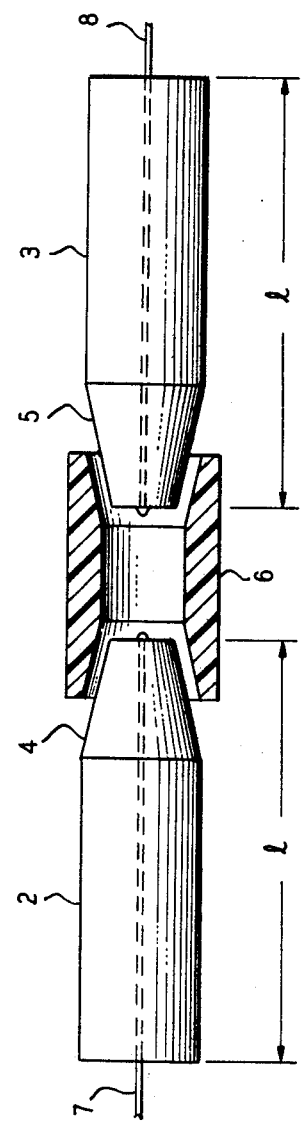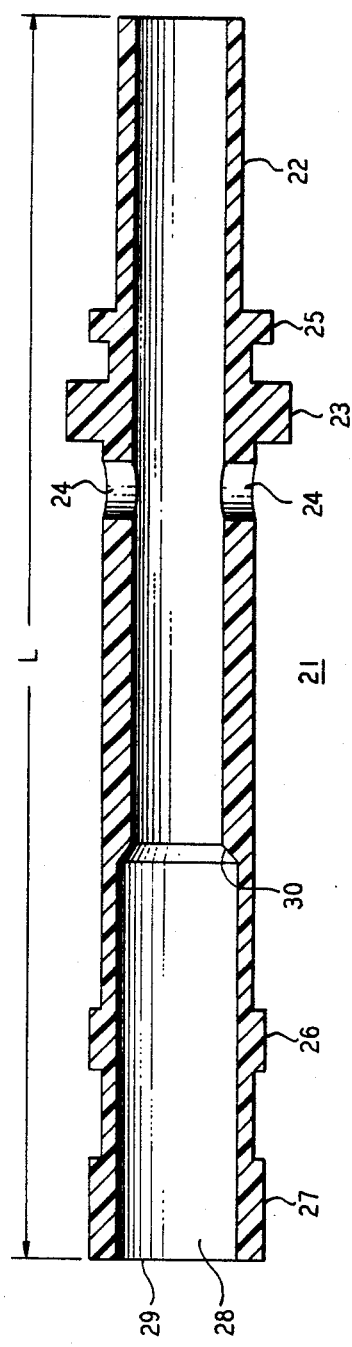

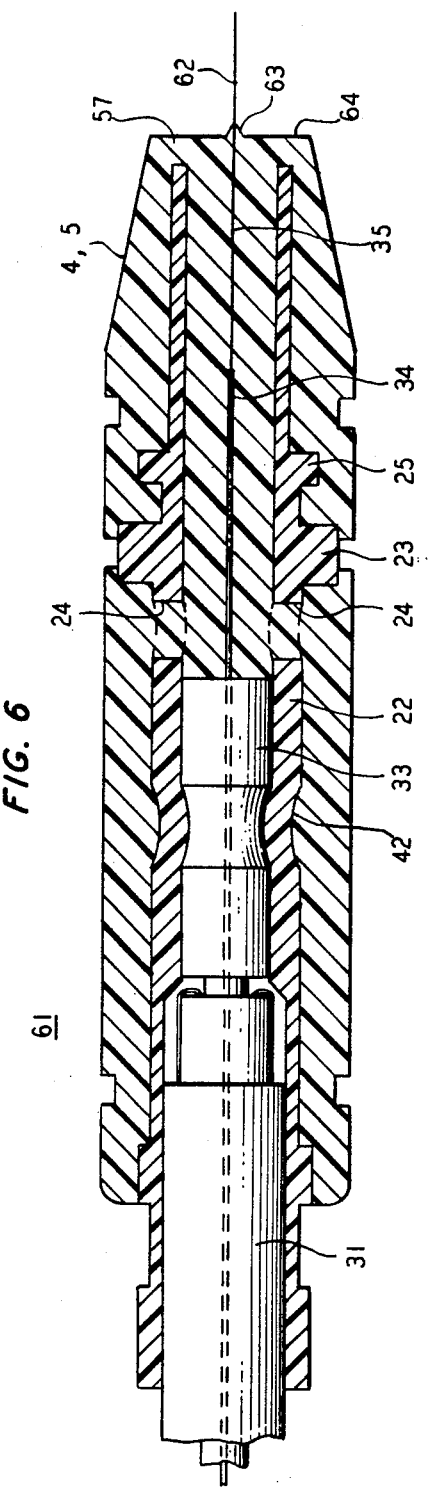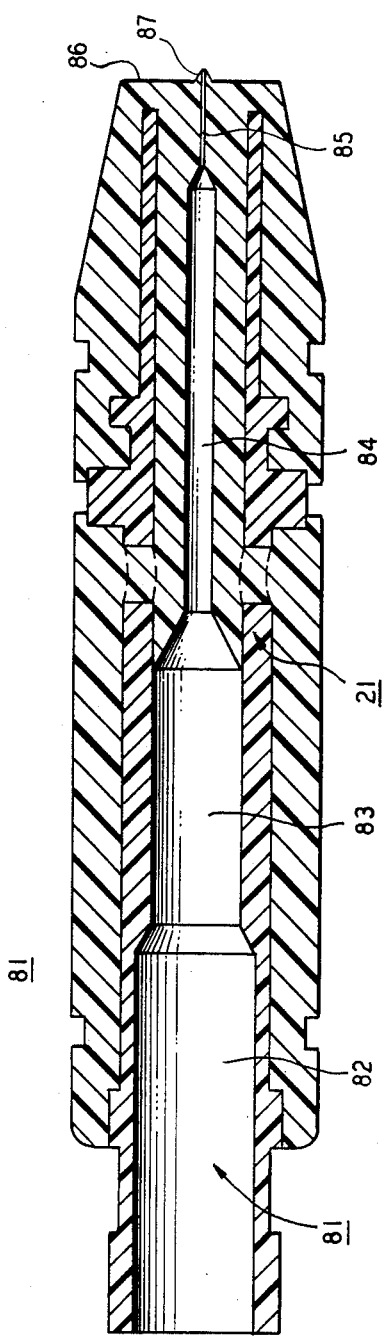

MOLDED OPTICAL FIBER CONNECTORS

TECHNICAL FIELD

The present invention relates to improved molded optical fiber connectors wherein the improvement resides in the use of an insert embedded in the connector body to reduce coupling losses.

BACKGROUND OF THE INVENTION

The implementation of optical transmission systems requires connectors to couple the optical fibers together. In telecommunications applications, these connectors must be routinely coupled and uncoupled during installation, testing and maintenance. It is desirable, therefore, that the connectors be durable, relatively maintenance free and capable of low-loss interconnection after repeated use.

Molded optical fiber connectors, either directly molded onto the end of an optical fiber or subsequently affixed thereto, are particularly well-suited for telecommunications applications. One such optical connector, for example, is disclosed in U.S. Pat. No. 4,107,242 to P. K. Runge, issued Aug. 15, 1978 and in a related application to the same inventor, Ser. No. 630,930, filed Nov. 11, 1975, now abandoned, and assigned to the present assignee. The referenced connector utilizes two tapered plugs which are accurately aligned end to end in a sleeve. Precise molding and dimensional stability of the connector alignment surfaces are required to provide a 0.4 dB coupling loss over many years of service.

In an application to L. Curtis, Ser. No. 837,398, filed Sept. 28, 1977, now U.S. Pat. No. 4,173,389 Nov. 6, 1979, and assigned to the present assignee, a sleeve member is inserted in the mold to eliminate surface defects in the connector. The sleeve traps the gas bubbles formed during molding, thereby eliminating voids which would otherwise be formed. While this technique works satisfactorily, dimensional stability and precise symmetry of the alignment surfaces can still be a problem. In addition, the molding of a connector about an optical fiber produces bending of the fiber. Such bends cause attenuation of the optical signal and, if severe, fiber breakage.

SUMMARY OF THE INVENTION

An improvement in molded optical fiber connectors is achieved through the use of an insert molded within the connector body. The insert partitions the mold and directs the flow of filler material in a predetermined fashion to provide extremely precise definition of the connector alignment surfaces. In addition, the insert allows longterm, low coupling losses by substantially improving the dimensional stability of these surfaces.

The insert comprises a sleeve, outwardly extending flange and several holes in the sleeve wall disposed to one side of the flange. The flange partitions the mold cavity into first and second portions; the former defines the critical connector alignment surfaces and the latter defines the remainder of the connector. Molded material is introduced into the second portion of the mold cavity. After this portion substantially fills, the mold material is accepted through the holes in the sleeve and is conducted toward the first portion.

A feature of the present invention is its adaptability to connectors either directly molded about an optical fiber or subsequently affixed thereto. Moreover, for the former type, the directed flow of mold material straightens any bends in the fiber, thereby eliminating this source of coupling losses.

A further feature of the present invention is that gas pockets formed during molding are directed back toward the flange and vented.

A still further feature of the present invention is its compatibility with existing molding apparatus and techniques.

BRIEF DESCRIPTION OF THE DRAWING

FIG. 1 shows an illustrative representation of a molded optical fiber connector to which the present invention pertains, the alignment sleeve being shown in cross-section;

FIG. 2 shows a cross-sectional view of an insert constructed in accordance with the present invention;

FIG. 6 illustrates a cross-sectional view of an embodiment of the present invention resulting from the molding operation shown in FIG. 5;

FIG. 8 shows a cross-sectional view of the alternate embodiment shown in FIG. 7 after molding.

DETAILED DESCRIPTION

Figure 3:
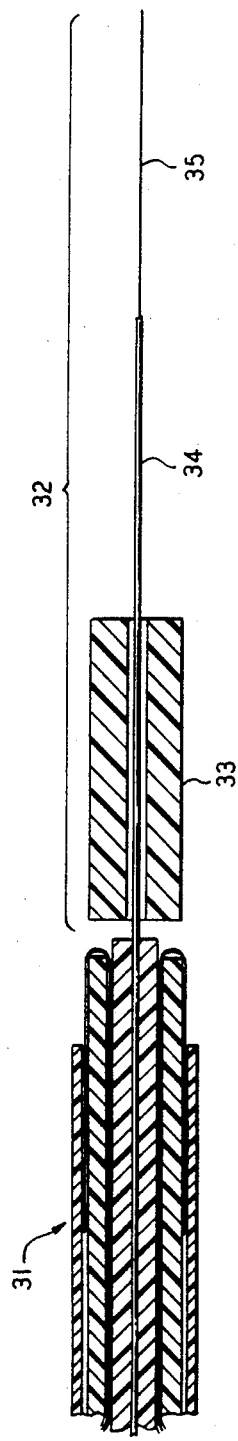
FIG. 3 shows a cross-sectional view of the assembly of an optical cable end and tube.

For purposes of illustration, the present improvement will be discussed with reference to the above-noted molded optical fiber connector. This connector, as shown in FIG. 1, utilizes two male plugs 2,3 having frustoconical ends 4,5, respectively. Insertion of ends 4,5 into the biconical aperture of sleeve 6 provides end to end alignment. As is obvious, low-loss optical coupling of fibers 7,8 requires, in part, precise dimensioning of ends 4 and 5.

FIG. 2 shows insert 21 which is embedded within male plug 2,3 to precisely control the initial formation and long-term dimensional stability of ends 4,5. Insert 21 comprises open-ended sleeve 22, adapted to receive an optical fiber, outwardly extending flange 23 and one or more holes 24 disposed to one side of flange 23. The aperture of sleeve 22 is conveniently dimensioned to form an opening 28 to slidingly receive an optical cable. Opening 28 extends from end 29 of sleeve 22 to shoulder 30. For reasons which would be clearer, infra, insert 21 advantageously includes a second flange 25, located on the side of flange 23 opposite to holes 24, and two spaced protuberances 26 and 27. The length L of insert 21 is substantially equal to the length 1 of male plugs 2 and 3.

Figure 4:
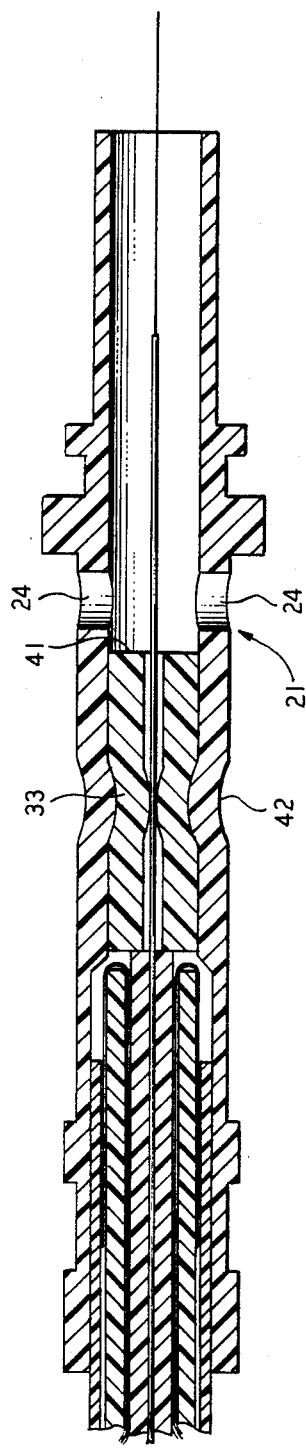
FIG. 4 illustrates a cross-sectional view of the assembly of FIG. 3 within the insert of FIG. 2.

Pursuant to one embodiment of the present invention, optical cable 31 having protruding optical fiber 32 is inserted into tube 33 as illustrated in FIG. 3. Optical fiber 32 comprises a plastic coated section 34 and an exposed fiber section 35. The assembly of fiber, cable end and tube is then inserted into insert 21 until an end 41 of tube 33 is proximate to holes 24 as depicted in FIG. 4. This relative positioning can be maintained by crimping insert 21 to tube 33 at location 42. Alternatively, the use of tube 33 and the crimping operation can be eliminated by the use of an adhesive material (not shown) to maintain the illustrated position of cable end 31.

Figure 5:
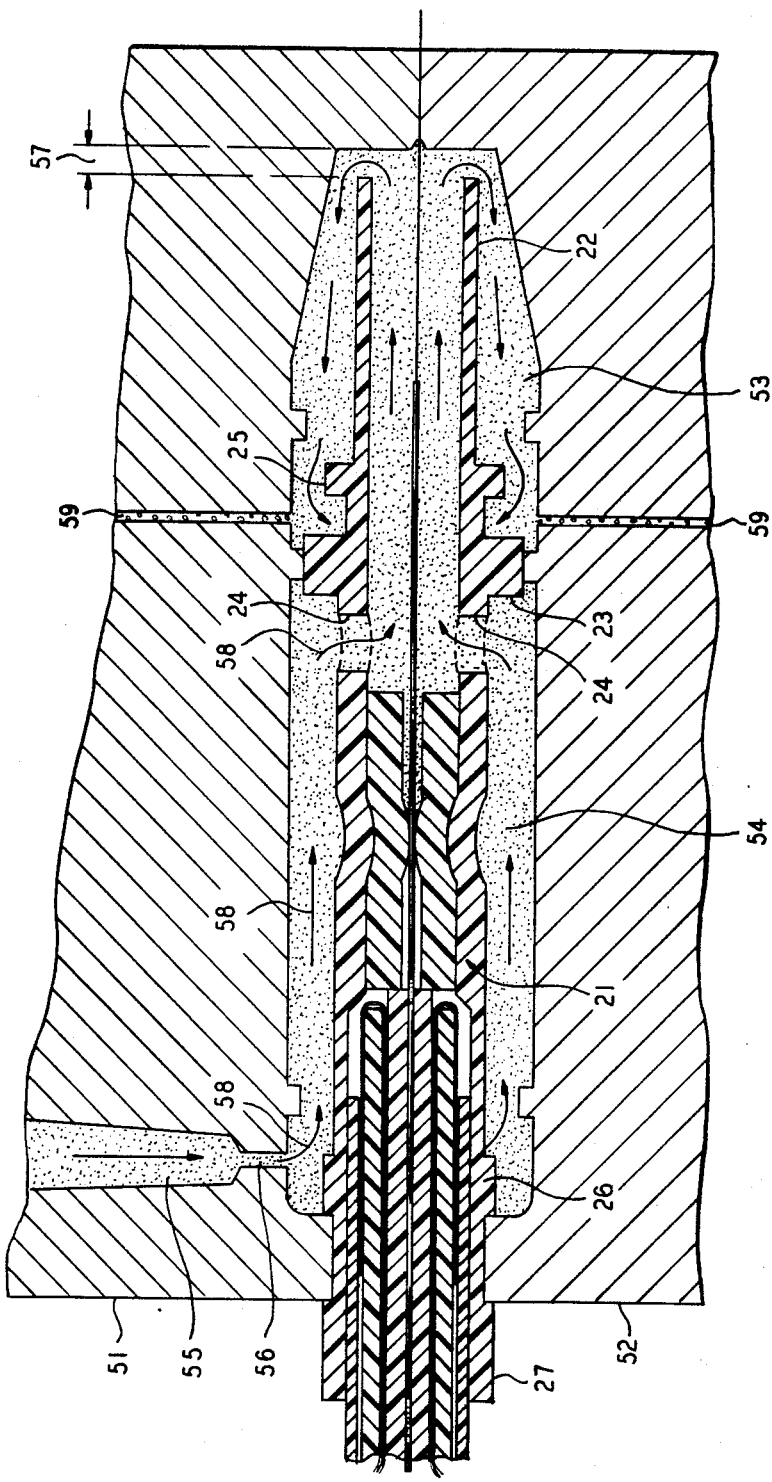
FIG. 5 depicts a cross-sectional view of the operation of the FIG. 4 assembly during molding.

Molding of connector plugs 2 or 3 about the assembly of FIG. 4 is shown in FIG. 5. Flange 23 partitions the mold cavity formed by mold members 51 and 52 into a first portion 53 and a second portion 54. First portion 53 defines the front of the plug containing frustoconical ends 4,5. Second portion 54 defines the balance of plugs 2,3. Flange 23 is preferably disposed close to the frustoconical end 4,5 to prevent any deformation of abutted ends caused by temperature variations during use. In addition, flange 23 maintains insert 21 centrally located in the mold cavity assuring a centered aperture for fiber 32. Spaced protuberances 26 and 27 preclude lateral movement of insert 21. Optical fiber 32 is centered within the mold cavity, the exposed section 35 retained in a precision aperture between mold members 51 and 52.

Filler material 55 enters second portion 54 via gate 56. After this portion substantially fills, the internal pressure generated forces the filler material 55 through holes 24 into sleeve 22. Material 55 entering sleeve 22 is conducted into first portion 53 and symmetrically fills the same. Filling of first portion 53 is expedited by maintaining a preselected gap 57 between the forward end of insert 21 and the mold cavity wall. The directed flow of filler material during molding is indicated by arrows 58. It should be noted that this directed flow transports any gas pockets formed toward flange 23 where they are vented through vent holes 59. These vent holes judiciously intersect a portion of the mold cavity wall that does not define frustoconical ends 4 or 5. The directed flow also provides a significant benefit by preventing bending and/or breaking of optical fiber 32 during molding.

FIG. 6 shows the improved molded connector plug 61 subsequently to the molding operation of FIG. 5. Such plugs consistently exhibit lower interconnection losses due to the precise definition and symmetry of the frustoconical end 4,5. These plugs were transfer molded with a mold temperature of 160 degrees centigrade and a pressure of 17.58 Kg/cm$^2$ (250 p.s.i.) applied to filler material 55. Second flange 25, smaller than flange 23, extends partially through first portion 53 to prevent movement of the solidified filler material. After molding, the plugs were cured at 160 degrees centigrade for three hours to complete cross-linking of the filler material. A silica filled epoxy, such as No. 2929B manufactured by Allied Chemical Corporation, is satisfactory. The insert was fabricated out of aluminum, however, any material capable of withstanding the above specified mold parameters without deformation is suitable. A gap 57 of 0.076 cm (0.030 inches) along with two 0.152 cm (0.060 inches) diameter holes 24, disposed opposite one another, provides satisfactory flow control. The exposed optical fiber end 62 protruding from improved plug 61 was cut and then lapped and polished until substantially flush with protuberance 63 on end face 64 as shown.

Figure 7:
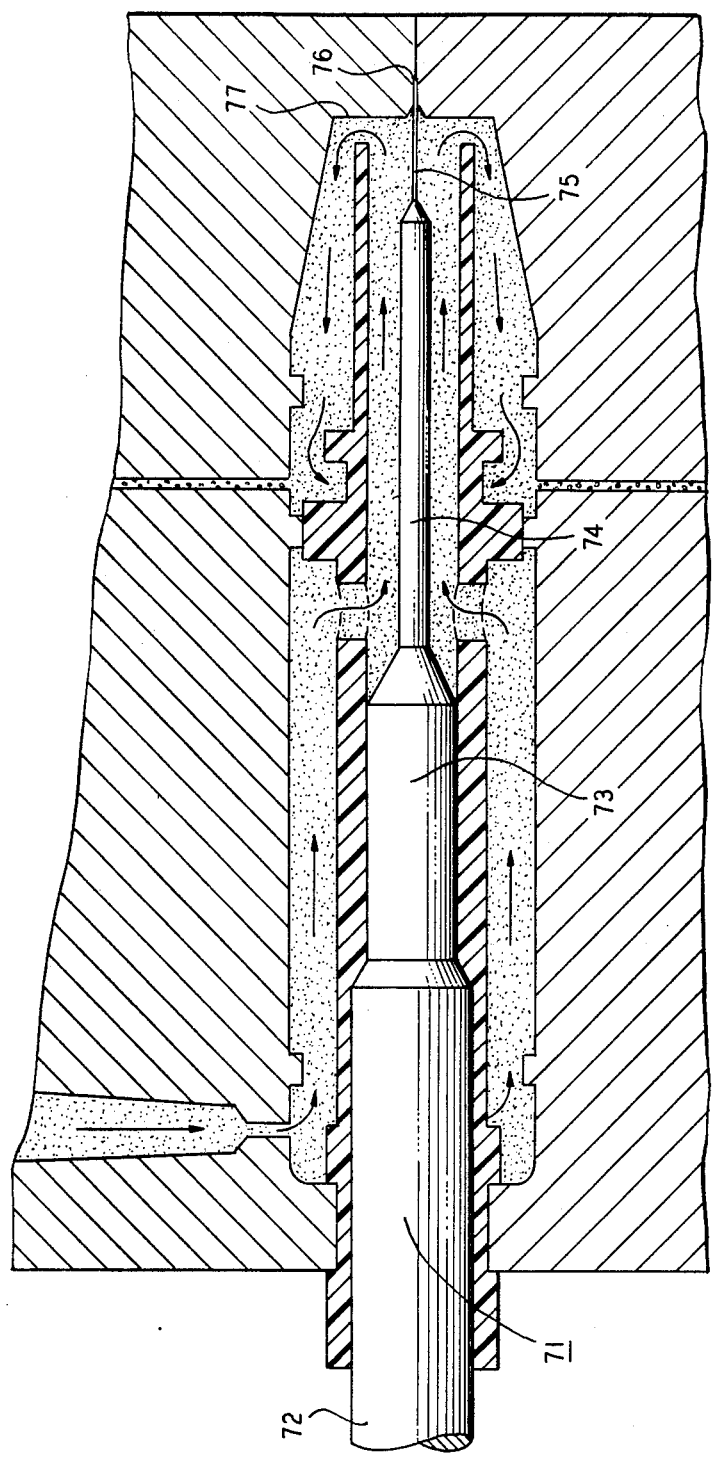
FIG. 7 shows a cross-sectional view of an alternate embodiment of the present invention during molding.

In accordance with an alternate embodiment of the present invention, insert 21 can be used in the fabrication of a field mountable connector plug as shown in FIG. 7. Such plugs are first molded and the optical fiber is subsequently affixed therein.

Mandrel 71 is inserted in insert 21 to maintain an opening for cable end 31 and optical fiber 32. Mandrel 71 comprises sections 72, 73, 74 and 75. Section 72 provides an opening for receiving cable end 31, while the remaining sections provide a descreasing aperture for guiding optical fiber 32 to central position 76 on front end face 77. Sections 72 and 73 snugly engage insert 21 to prevent the flow of filler material in these sections and eliminate the need for adhesive or crimping to maintain mandrel 71 in position. The balance of the molding process is identical to that described above. The field mountable molded plug 81, is shown in FIG. 8. An optical fiber 32 extending from cable end 31 can be inserted within plug 81 by filling openings 82, 83, 84 and 85 with adhesive. The portion of the optical fiber extending from end face 86 is cut, lapped and polished until substantially flush with protuberance 87.

I claim:

1. An optical fiber connector plug (2,3) having a body molded from filler material comprising a first body portion (53) having a predetermined shape for alignment, a second body portion (54) defining the remainder of said connector body, and a sleeve (22) embedded in said molded body and adapted to receive an optical fiber, said sleeve extending substantially through said first and second portions CHARACTERIZED IN THAT said sleeve includes a flange (23) extending from the outer surface of said sleeve to substantially separate said first and second body portions, and one or more holes (24) accepting the flow of filler material (55) into said sleeve after said second portion is substantially filled and directing the same through said sleeve to said first portion thereby providing precise definition of said predetermined shape.

2. An optical fiber connector plug (2,3) having a body molded from filler material (55) comprising a first body portion (53) having a predetermined shape for alignment, a second body portion (54) defining the remainder of the connector body, and a sleeve (22) embedded in said molded body and adapted to receive an optical fiber, said sleeve extending substantially through said first and second portions CHARACTERIZED IN THAT said sleeve includes a flange (23) extending from the outer surface of said sleeve to substantially separate said first and second portions and one or more holes (24) disposed in said sleeve wall within said second portion to accept said filler material.

3. The optical fiber connector of claim 2 wherein said sleeve further includes a second flange (25) smaller than said first flange, extending from the outer surface of said sleeve in said first body portion.

4. The optical fiber connector of claim 3 wherein said sleeve further includes two spaced protuberances (26, 27) in said second body portion.

5. The optical fiber connector of claim 4 wherein said first body portion is substantially frustoconical.

6. The optical fiber connector of claim 5 wherein said sleeve contains an optical fiber extending completely through said first and second body portions.

7. A method of molding an optical fiber connector having a first body portion (53) of a predetermined shape for alignment and a second body portion (54) defining the remainder of the connector body CHARACTERIZED BY the steps of inserting a sleeve (22) adapted to receive an optical fiber (31) in the mold cavity, said sleeve extending substantially through said first and second portions, said sleeve having a flange (25) extending from the outer surface of said sleeve to substantially separate said first and second portions and one or more holes (24) disposed in said sleeve wall within said second portion, inserting a mandrel (71) within said sleeve and completely through said mold cavity, said mandrel having a first section (72, 73) which seals off said sleeve and terminates proximate to said holes, and a second section (74, 75) extending from said first section having a cross section equivalent to that of said optical fiber, and injecting filler material (55) into said second portion of said mold cavity, said filler material being accepted into said holes and conducted through said sleeve to said first portion after said second portion substantially fills.

8. The method of claim 7 wherein said sleeve further includes a second flange (25), smaller than said flange, in said first body portion.

9. The method of claim 8 wherein said first body portion is frustoconical.

10. The method of molding an optical fiber connector of claim 9 wherein said sleeve further includes two spaced protruberances (26,27) in said second body portion.

11. A method of molding an optical fiber connector having a first body portion (53) of predetermined shape for alignment and a second body portion (54) defining the remainder of the connector body CHARACTERIZED BY the steps of inserting an optical cable end (31) having an extending optical fiber (32) into a sleeve (22) long enough to pass substantially through said first and second portions, said sleeve having a flange extending from the outer surface of said sleeve to substantially separate said first and second portions of the molded cavity when inserted therein, and one or more holes (24) disposed in said sleeve wall within said second portion, sealing said sleeve between said cable end and said one or more holes, inserting said sleeve and retained optical fiber within the mold cavity, said optical fiber passing completely through the mold cavity, and injecting filler material (55) into said second portion of the mold cavity, said filler material being accepted into said holes and conducted through said sleeve to said first portion after said second portion substantially fills.

12. The method of claim 11 wherein said sleeve further includes a second flange (25), smaller than said flange, in said first body portion.

13. The method of claim 12 wherein said first body portion is frustoconical.

14. The method of claim 13 wherein said sleeve further includes two spaced protuberances (26,27) in said second body portion.

* * * * *